United States Patent
Griffiths et al.

(10) Patent No.: US 10,740,061 B2
(45) Date of Patent: *Aug. 11, 2020

(54) PROVIDING MEDIA FOR PLAYBACK

(71) Applicant: Sonos, Inc., Santa Barbara, CA (US)

(72) Inventors: Neil Griffiths, Cambridge, MA (US); Jonathan Reilly, Cambridge, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/141,846

(22) Filed: Sep. 25, 2018

(65) Prior Publication Data

US 2019/0065139 A1    Feb. 28, 2019

Related U.S. Application Data

(63) Continuation of application No. 15/016,259, filed on Feb. 4, 2016, now Pat. No. 10,114,606, which is a
(Continued)

(51) Int. Cl.
*G06F 3/16* (2006.01)
*H04N 21/262* (2011.01)
(Continued)

(52) U.S. Cl.
CPC ............ *G06F 3/165* (2013.01); *G06F 16/639* (2019.01); *G11B 20/10527* (2013.01);
(Continued)

(58) Field of Classification Search
CPC . G11B 27/102; G06F 3/165; H04R 2227/005; H04L 65/4069; H04L 65/60;
(Continued)

(56) References Cited

U.S. PATENT DOCUMENTS 5,440,644 A    8/1995  Farinelli et al.
5,761,320 A    6/1998  Farinelli et al.
(Continued)

FOREIGN PATENT DOCUMENTS

EP    1389853 A1    2/2004
EP    2194471 A1    6/2010
(Continued)

OTHER PUBLICATIONS

AudioTron Quick Start Guide, Version 1.0, Mar. 2001, 24 pages.
(Continued)

*Primary Examiner* — Jesse A Elbin
(74) *Attorney, Agent, or Firm* — McDonnell Boehnen Hulbert & Berghoff LLP

(57) ABSTRACT

Embodiments are disclosed for providing play/pause content. An example method includes receiving a command to play audio from a zone, the zone including one or more playback devices, wherein the zone is configured to play items from a playback queue responsive to the command to play audio. The example method also includes determining that the playback queue includes no playable items. The example method also includes automatically placing information identifying at least one playable item in the playback queue. The example method also includes, responsive to the command to play audio, causing to play the at least one playable item by the zone.

20 Claims, 11 Drawing Sheets

Related U.S. Application Data continuation of application No. 13/937,890, filed on Jul. 9, 2013, now Pat. No. 9,298,415.

(51) Int. Cl.

| | |
|---|---|
| *G06F 16/638* | (2019.01) |
| *G11B 27/10* | (2006.01) |
| *H04N 21/436* | (2011.01) |
| *H04N 21/462* | (2011.01) |
| *H04N 21/482* | (2011.01) |
| *H04N 21/81* | (2011.01) |
| *H04N 21/432* | (2011.01) |
| *H04N 21/433* | (2011.01) |
| *G11B 20/10* | (2006.01) |
| *H04L 29/06* | (2006.01) |
| *H04R 27/00* | (2006.01) |
| *H04L 12/28* | (2006.01) |

(52) U.S. Cl.
CPC ............ *G11B 27/105* (2013.01); *H04L 65/60* (2013.01); *H04N 21/26258* (2013.01); *H04N 21/436* (2013.01); *H04N 21/4325* (2013.01); *H04N 21/4332* (2013.01); *H04N 21/43615* (2013.01); *H04N 21/462* (2013.01); *H04N 21/4825* (2013.01); *H04N 21/8113* (2013.01); *H04R 27/00* (2013.01); *G11B 27/102* (2013.01); *G11B 2020/10657* (2013.01); *H04L 65/4069* (2013.01); *H04L 2012/2849* (2013.01); *H04R 2227/005* (2013.01)

(58) Field of Classification Search
CPC ...... H04L 2012/2849; H04N 21/26258; H04N 21/42204; H04N 21/44204; H04N 21/47202
USPC .................................. 700/94; 715/716, 727
See application file for complete search history.

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter et al. |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,643,744 | B1 | 11/2003 | Cheng |
| 6,757,517 | B2 | 6/2004 | Chang et al. |
| 6,778,869 | B2 | 8/2004 | Champion |
| 6,985,694 | B1 | 1/2006 | De Bonet et al. |
| 7,130,608 | B2 | 10/2006 | Hollstrom et al. |
| 7,130,616 | B2 | 10/2006 | Janik |
| 7,143,939 | B2 | 12/2006 | Henzerling |
| 7,187,947 | B1 | 3/2007 | White et al. |
| 7,236,773 | B2 | 6/2007 | Thomas |
| 7,295,548 | B2 | 11/2007 | Blank et al. |
| 7,312,785 | B2 | 12/2007 | Tsuk et al. |
| 7,483,538 | B2 | 1/2009 | McCarty et al. |
| 7,509,181 | B2 | 3/2009 | Champion |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,689,304 | B2 | 3/2010 | Sasaki |
| 7,742,740 | B2 | 6/2010 | Goldberg et al. |
| 7,835,689 | B2 | 11/2010 | Goldberg et al. |
| 7,853,341 | B2 | 12/2010 | McCarty et al. |
| 7,881,656 | B2 | 2/2011 | Khedouri et al. |
| 7,949,707 | B2 | 5/2011 | McDowall et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,050,652 | B2 | 11/2011 | Qureshey et al. |
| 8,055,364 | B2 | 11/2011 | Champion |
| 8,074,253 | B1 | 12/2011 | Nathan |
| 8,103,009 | B2 | 1/2012 | McCarty et al. |
| 8,111,132 | B2 | 2/2012 | Allen et al. |
| 8,148,622 | B2 | 4/2012 | Rothkopf et al. |
| 8,214,740 | B2 | 7/2012 | Johnson |
| 8,234,395 | B2 | 7/2012 | Millington et al. |
| 8,332,414 | B2 | 12/2012 | Nguyen et al. |
| 8,407,623 | B2 | 3/2013 | Kerr et al. |
| 8,483,853 | B1 | 7/2013 | Lambourne et al. |
| 8,843,586 | B2 | 9/2014 | Pantos et al. |
| 8,954,177 | B2 | 2/2015 | Sanders |
| 8,966,394 | B2 | 2/2015 | Gates et al. |
| 9,137,602 | B2 | 9/2015 | Mayman et al. |
| 2001/0042107 | A1 | 11/2001 | Palm |
| 2001/0043592 | A1 | 11/2001 | Jimenez et al. |
| 2002/0022453 | A1 | 2/2002 | Balog et al. |
| 2002/0026442 | A1 | 2/2002 | Lipscomb et al. |
| 2002/0089529 | A1 | 7/2002 | Robbin |
| 2002/0124097 | A1 | 9/2002 | Isely et al. |
| 2003/0157951 | A1 | 8/2003 | Hasty |
| 2004/0024478 | A1 | 2/2004 | Hans et al. |
| 2004/0148344 | A1 | 7/2004 | Navar et al. |
| 2006/0008256 | A1 | 1/2006 | Khedouri et al. |
| 2006/0026521 | A1 | 2/2006 | Hotelling et al. |
| 2006/0195480 | A1 | 8/2006 | Spiegelman et al. |
| 2006/0225097 | A1 | 10/2006 | Lawrence-Apfelbaum |
| 2007/0038672 | A1 | 2/2007 | Plastina et al. |
| 2007/0142944 | A1 | 6/2007 | Goldberg et al. |
| 2008/0126418 | A1 | 5/2008 | Vignoli et al. |
| 2009/0063274 | A1 | 3/2009 | Dublin, III et al. |
| 2009/0171487 | A1 | 7/2009 | Wilhelm et al. |
| 2011/0087842 | A1 | 4/2011 | Lu et al. |
| 2011/0119626 | A1 | 5/2011 | Faenger |
| 2011/0234480 | A1 | 9/2011 | Fino et al. |
| 2012/0207448 | A1 | 8/2012 | Hama |
| 2012/0268145 | A1 | 10/2012 | Chandra et al. |
| 2013/0022221 | A1 | 1/2013 | Kallai et al. |
| 2013/0047084 | A1 | 2/2013 | Sanders et al. |
| 2013/0167029 | A1 | 6/2013 | Friesen et al. |
| 2013/0174204 | A1 | 7/2013 | Coburn, IV et al. |
| 2014/0006483 | A1 | 1/2014 | Garmark et al. |
| 2014/0075308 | A1 | 3/2014 | Sanders et al. |
| 2014/0108929 | A1 | 4/2014 | Garmark et al. |
| 2014/0123005 | A1 | 5/2014 | Forstall et al. |
| 2014/0140530 | A1 | 5/2014 | Gomes-Casseres et al. |
| 2014/0378056 | A1 | 12/2014 | Liu et al. |
| 2015/0026613 | A1 | 1/2015 | Kwon et al. |
| 2015/0074527 | A1 | 3/2015 | Sevigny et al. |
| 2015/0074528 | A1 | 3/2015 | Sakalowsky et al. |
| 2015/0256954 | A1 | 9/2015 | Carlsson et al. |

FOREIGN PATENT DOCUMENTS

| | | |
|---|---|---|
| JP | 2008535127 A | 8/2008 |
| WO | 200153994 | 7/2001 |
| WO | 2003093950 A2 | 11/2003 |
| WO | 2006085284 A1 | 8/2006 |
| WO | 2008004181 A2 | 1/2008 |
| WO | 2014149533 A2 | 9/2014 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Chinese Patent Office, Office Action dated Sep. 13, 2017, issued in connection with Chinese Application No. 201480044943.2, 13 pages.

(56) References Cited

OTHER PUBLICATIONS

Chinese Patent Office, Second Office Action dated May 30, 2018, issued in connection with Chinese Application No. 201480044943. 2, 7 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, Decision to Refuse EP Application dated Sep. 13, 2018, issued in connection with European Application No. 14823712.6, 27 pages.
European Patent Office, Examination Report dated Apr. 24, 2017, issued in connection with European Application No. 14823712.6, 7 pages.
European Patent Office, Extended Examination Report dated Jun. 3, 2016, issued in connection with European Patent Application No. 14823712.6, 9 pages.
European Patent Office, Summons to Attend Oral Proceedings dated Dec. 1, 2017, issued in connection with European Patent Application No. 14823712.6, 8 pages.
Final Office Action dated Apr. 26, 2018, issued in connection with U.S. Appl. No. 15/016,259, filed Feb. 4, 2016, 20 pages.
Japanese Patent Office, Full English Translation of Office Action dated May 9, 2017, issued in connection with Japanese Patent Application No. 2016-525403, 5 pages.
Japanese Patent Office, Office Action dated May 9, 2017, issued in connection with Japanese Patent Application No. 2016-525403, 7 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Motorola, "Simplefi, Wireless Digital Audio Receiver, Installation and User Guide," Dec. 31, 2001, 111 pages.
Non-Final Office Action dated Oct. 2, 2017, issued in connection with U.S. Appl. No. 15/016,259, filed Feb. 4, 2016, 18 pages.
Non-Final Office Action dated Feb. 24, 2015, in connection with U.S. Appl. No. 13/937,890, filed Jul. 9, 2013, 18 pages.
Notice of Allowance dated Aug. 13, 2018, issued in connection with U.S. Appl. No. 15/016,259, filed Feb. 4, 2016, 7 pages.
Notice of Allowance dated Dec. 16, 2015, in connection with U.S. Appl. No. 13/937,890, filed Jul. 9, 2013, 10 pages.
Palm, Inc., "Handbook for the Palm VII Handheld," May 2000, 311 pages.
Presentations at WinHEC 2000, May 2000, 138 pages.
Prismiq, Inc., "Prismiq Media Player User Guide," 2003, 44 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

PROVIDING MEDIA FOR PLAYBACK

CROSS REFERENCE TO RELATED APPLICATIONS

The present application is a continuation of U.S. application Ser. No. 15/016,259 filed Feb. 4, 2016 which is a continuation of U.S. application Ser. No. 13/937,890 filed Jul. 9, 2013, both of which are incorporated herein by reference in their entirety.

FIELD OF THE DISCLOSURE

The disclosure is related to consumer goods and, more particularly, to methods, systems, products, features, services, and other items directed to media playback or some aspect thereof.

BACKGROUND

Digital music has become readily available due in part to the development of consumer level technology that has allowed people to listen to digital music on a personal audio device. The consumer's increasing preference for digital audio has also resulted in the integration of personal audio devices into PDAs, cellular phones, and other mobile devices. The portability of these mobile devices has enabled people to take the music listening experience with them and outside of the home. People have become able to consume digital music, like digital music files or even Internet radio, in the home through the use of their computer or similar devices. Now there are many different ways to consume digital music, in addition to other digital content including digital video and photos, stimulated in many ways by high-speed Internet access at home, mobile broadband Internet access, and the consumer's hunger for digital media.

Until recently, options for accessing and listening to digital audio in an out-loud setting were severely limited. In 2005, Sonos offered for sale its first digital audio system that enabled people to, among many other things, access virtually unlimited sources of audio via one or more networked connected zone players, dynamically group or ungroup zone players upon command, wirelessly send the audio over a local network amongst zone players, and play the digital audio out loud in synchrony. The Sonos system can be controlled by software applications downloaded to certain network capable, mobile devices and computers.

Given the insatiable appetite of consumers towards digital media, there continues to be a need to develop consumer technology that revolutionizes the way people access and consume digital media.

BRIEF DESCRIPTION OF THE DRAWINGS

Features, aspects, and advantages of the presently disclosed technology may be better understood with regard to the following description, appended claims, and accompanying drawings where:

Figure 1:
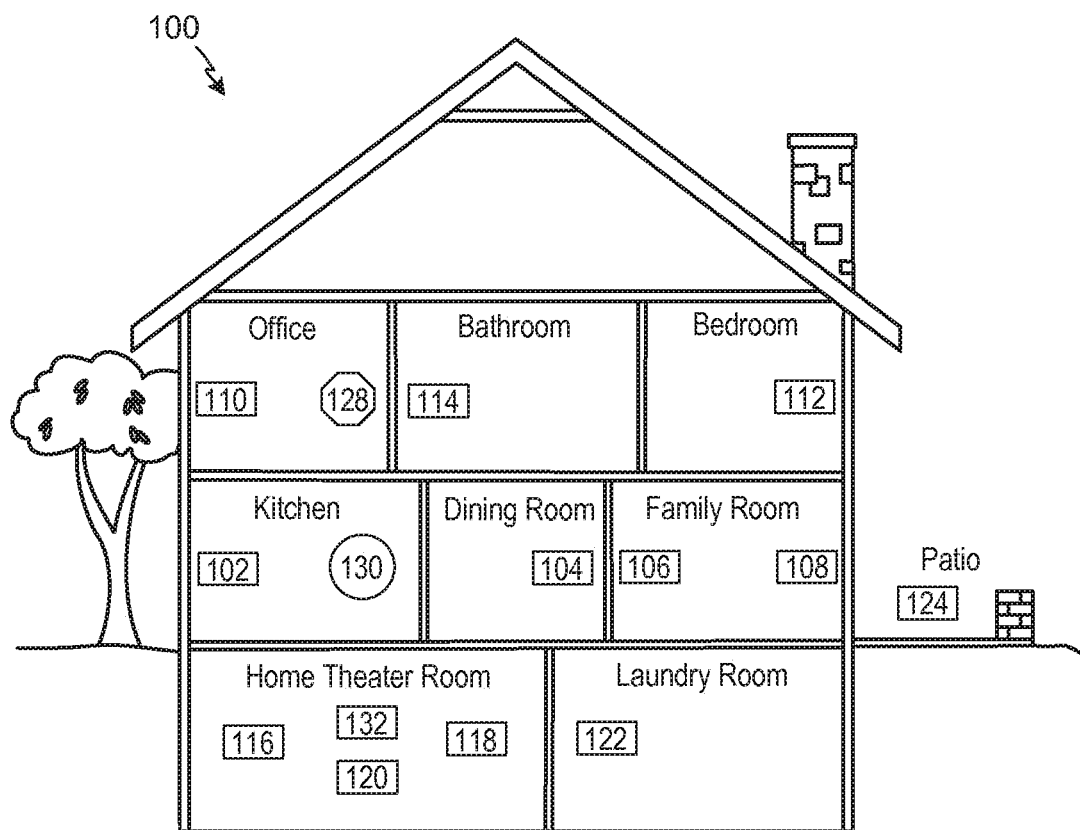
FIG. 1 shows an example configuration in which certain embodiments may be practiced.

In addition, the drawings are for the purpose of illustrating example embodiments, but it is understood that the inventions are not limited to the arrangements and instrumentality shown in the drawings.

DETAILED DESCRIPTION

I. Overview

Embodiments disclosed herein enable content playback control via a user interface included with a zone player. In some embodiments, the zone player includes a limited user interface. For example, the zone player may include a control interface including one or more input device(s), button(s), etc. for play/pause control and volume up and volume down control, and an output interface (e.g., one or more light emitting diode(s)) to output status information. In some embodiments, the zone player responds to user input received via the control interface based on the current playback mode of the playback device. For example, when operating in a content playback mode and the play/pause control is selected, the zone player may pause content playback. In contrast, when the play/pause control is selected while the zone player is in a paused content playback mode, then the zone player may attempt to resume content playback with the content that was playing previous to entering the paused content playback mode. However, in some embodiments, the previously played content may be unavailable. Unlike prior systems, embodiments disclosed herein enable the zone player to determine playback content to be played when a user selects (e.g., presses or otherwise activates) the play/pause control based on the current playback mode of the zone player and the availability of playback content.

Other embodiments, as those discussed in the following and others as can be appreciated by one having ordinary skill in the art are also possible.

II. Example Operating Environment

Referring now to the drawings, in which like numerals can refer to like parts throughout the figures, FIG. 1 shows an example media system configuration 100 in which one or more embodiments disclosed herein can be practiced or implemented.

By way of illustration, the media system configuration 100 is associated with a home having multiple zones, though the home could have been configured with only one zone. Additionally, one or more zones can be added over time. Each zone may be assigned by a user to a different room or space, such as, for example, an office, bathroom, bedroom, kitchen, dining room, family room, home theater room, utility or laundry room, and patio. A single zone might also include multiple rooms or spaces if so configured. With respect to FIG. 1, one or more of zone players 102-124 are shown in each respective zone. A zone player 102-124, also referred to herein as a playback device, multimedia unit, speaker, player, and so on, provides audio, video, and/or audiovisual output. A controller 130 (e.g., shown in the kitchen for purposes of this illustration) provides control to the media system configuration 100. Controller 130 may be fixed to a zone, or alternatively, mobile such that it can be moved about the zones. The media system configuration 100 may also include more than one controller 130, and additional controllers may be added to the system over time.

The media system configuration 100 illustrates an example whole house media system, though it is understood that the technology described herein is not limited to, among other things, its particular place of application or to an expansive system like a whole house media system 100 of FIG. 1.

a. Example Zone Players

Figure 2A:
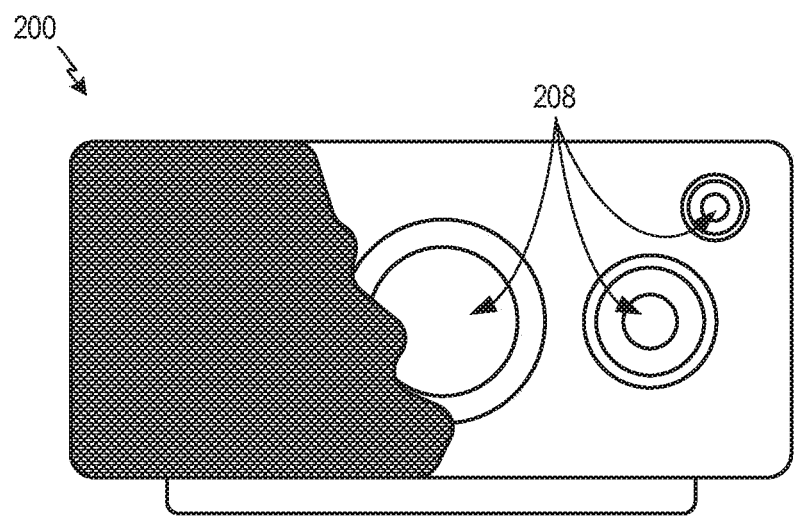
FIG. 2A shows an illustration of an example zone player having a built-in amplifier and transducers.
Figure 2B:
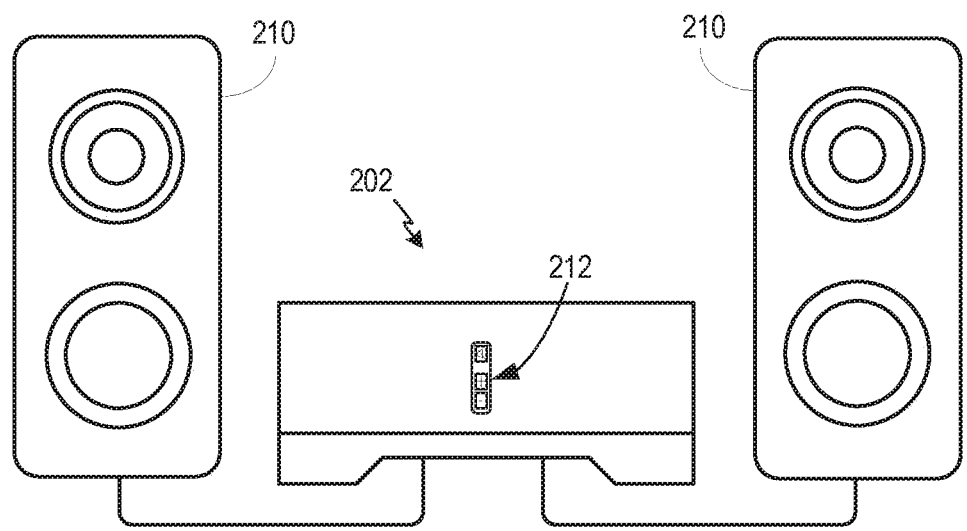
FIG. 2B shows an illustration of an example zone player having a built-in amplifier and connected to external speakers.
Figure 2C:
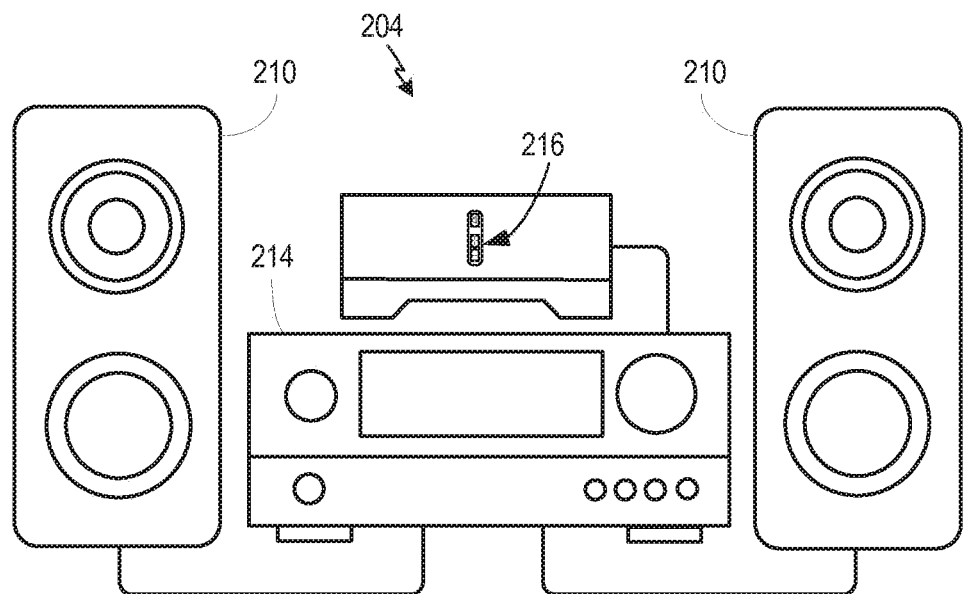
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more acoustic transducers (e.g., speakers). A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 may be dynamically configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path. In the illustrated example, the zone player 202 includes a control interface 212. The control interface 212 permits a user to enter data and/or commands into the zone player 202. In some embodiments, a user may use the control interface 212 to control operations of the zone player 202. For example, a user may control the audio characteristics (e.g., volume) of the zone player 202 and/or the playback mode (e.g., playback, pause, stop) of the zone player 202.

FIG. 2C illustrates zone player 204 that does not include a built-in amplifier, but is configured to communicate an audio signal, received over a data network, to an audio (or "audio/video") receiver 214 with built-in amplification. In the illustrated example, the zone player 204 includes a control interface 216 to enable a user to enter data and/or commands into the zone player 204.

Referring back to FIG. 1, in some embodiments, one, some, or all of the zone players 102 to 124 can retrieve audio directly from a source. For example, a particular zone player in a zone or zone group may be assigned to a playback queue (or "queue"). The playback queue contains information corresponding to zero or more audio items for playback by the associated zone or zone group. In an embodiment, the playback queue includes information identifying items (e.g., all items) for playback by the associated zone to the user. According to the embodiment, for example, the playback queue includes information displayed in a "now playing" or similar interface and in a "display queue" or similar interface. A "now playing" interface, for instance, displays information identifying an item that is currently being played by a zone, or an item that is currently stopped or paused from playback. A "display queue" interface, for instance, displays information identifying a list of zero or more items for playback by the zone. In one example, an item can be identified in both the "now playing" and "display queue" interfaces (e.g., when a song in the display queue is currently playing). In another example, the playback queue is empty when the "now playing" interface and the "display queue" interface are empty. In another example, the playback queue is not empty when either the "now playing" interface or the "display queue" interface displays information identifying one or more items (e.g., when Internet radio is playing, the item may show up only in the "now playing" interface). The playback queue may be stored in memory on a zone player or some other designated device. Each item contained in the playback queue may comprise a uniform resource identifier (URI) or some other identifier that can be used by the zone player(s) to seek out and/or retrieve the audio items from the identified audio source(s). Depending on the item, the audio source might be found on the Internet (e.g., the cloud), locally from another device over the data network 128 (described further below), from the controller 130, stored on the zone player itself, or from an audio source communicating directly to the zone player. In some embodiments, the zone player can reproduce the audio itself (e.g., play the audio), send the audio to another zone player for reproduction, or both where the audio is reproduced by the zone player as well as one or more additional zone players (possibly in synchrony). In some embodiments, the zone player may play a first audio content (or alternatively, may not play the content at all), while sending a second, different audio content to another zone player(s) for reproduction. To the user, each item in a playback queue is represented on an interface of a controller by an element such as a track name, album name, playlist, or other some other representation. A user can populate the playback queue with audio items of interest. The user may also modify and clear the playback queue, if so desired.

By way of illustration, SONOS, Inc. of Santa Barbara, Calif. presently offers for sale zone players referred to as a "PLAY:5," "PLAY:3," "PLAYBAR," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player may include or interact with a docking station for an Apple IPOD™ or similar device.

b. Example Controllers

Figure 3:
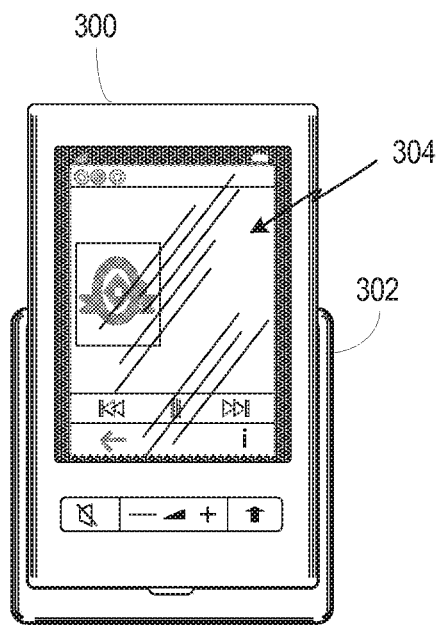
FIG. 3 shows an illustration of an example controller.

FIG. 3 illustrates an example wireless controller 300 in docking station 302. By way of illustration, controller 300 may correspond to controlling device 130 of FIG. 1. Docking station 302, if provided or used, may provide power to the controller 300 and additionally may charge a battery of controller 300. In some embodiments, controller 300 may be provided with a touch screen 304 that allows a user to interact through touch with the controller 300, for example, to retrieve and navigate a playlist of audio items, control operations of one or more zone players, and provide overall control of the system configuration 100. In other embodiments, other input mechanisms such as voice control may be used to interact with the controller 300. In certain embodiments, any number of controllers can be used to control the system configuration 100. In some embodiments, there may be a limit set on the number of controllers that can control the system configuration 100. The controllers might be wireless like wireless controller 300 or wired to data network 128.

In some embodiments, if more than one controller is used in system 100 of FIG. 1, each controller may be coordinated to display common content, and may all be dynamically updated to indicate changes made to the system 100 from a single controller. Coordination can occur, for instance, by a controller periodically requesting a state variable directly or indirectly from one or more of the zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an IPHONE™, IPAD™, ANDROID™ powered phone or tablet, or any other smart phone or network-enabled device can be used as controller 130. An application running on a laptop or desktop personal computer (PC) or Mac™ can also be used as controller 130. Such controllers may connect to system 100 through an interface with data network 128, a zone player, a wireless router, or using some other configured connection path. Example controllers offered by Sonos, Inc. of Santa Barbara, Calif. include a "Controller 200," "SONOS® CONTROL," "SONOS® Controller for IPHONE™," "SONOS® Controller for IPAD™," "SONOS® Controller for ANDROID™," "SONOS® Controller for MAC™ or PC."

c. Example Data Connection

Zone players 102 to 124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players are coupled to data network 128 using a centralized access point such as a wired or wireless router. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, a "bonded zone" is a zone that contains two or more zone players, such as the two zone players 106 and 108 in the family room, whereby the two zone players 106 and 108 can be configured to play the same audio source in synchrony. In one example, the two zone players 106 and 108 can be paired to play two separate sounds in left and right channels, for example. In other words, the stereo effects of a sound can be reproduced or enhanced through the two zone players 106 and 108, one for the left sound and the other for the right sound. In another example, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player has additional speaker drivers from which sound can be passed. The consolidated zone player can further be paired with a single zone player or yet another consolidated zone player. Each playback device of a consolidated playback device can be set in a consolidated mode, for example.

In certain embodiments, paired or consolidated zone players (also referred to as "bonded zone players") can play audio in synchrony with other zone players in the same or different zones.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, audio on a zone player itself may be accessed and played. In some embodiments, audio on a controller may be accessed via the data network 128 and played. In some embodiments, music from a personal library stored on a computer or networked-attached storage (NAS) may be accessed via the data network 128 and played. In some embodiments, Internet radio stations, shows, and podcasts may be accessed via the data network 128 and played. Music or cloud services that let a user stream and/or download music and audio content may be accessed via the data network 128 and played. Further, music may be obtained from traditional sources, such as a turntable or CD player, via a line-in connection to a zone player, for example. Audio content may also be accessed using a different protocol, such as AIRPLAY™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 may be shared with any of the zone players 102-124 in the audio system 100.

III. Example Zone Players

Figure 4:
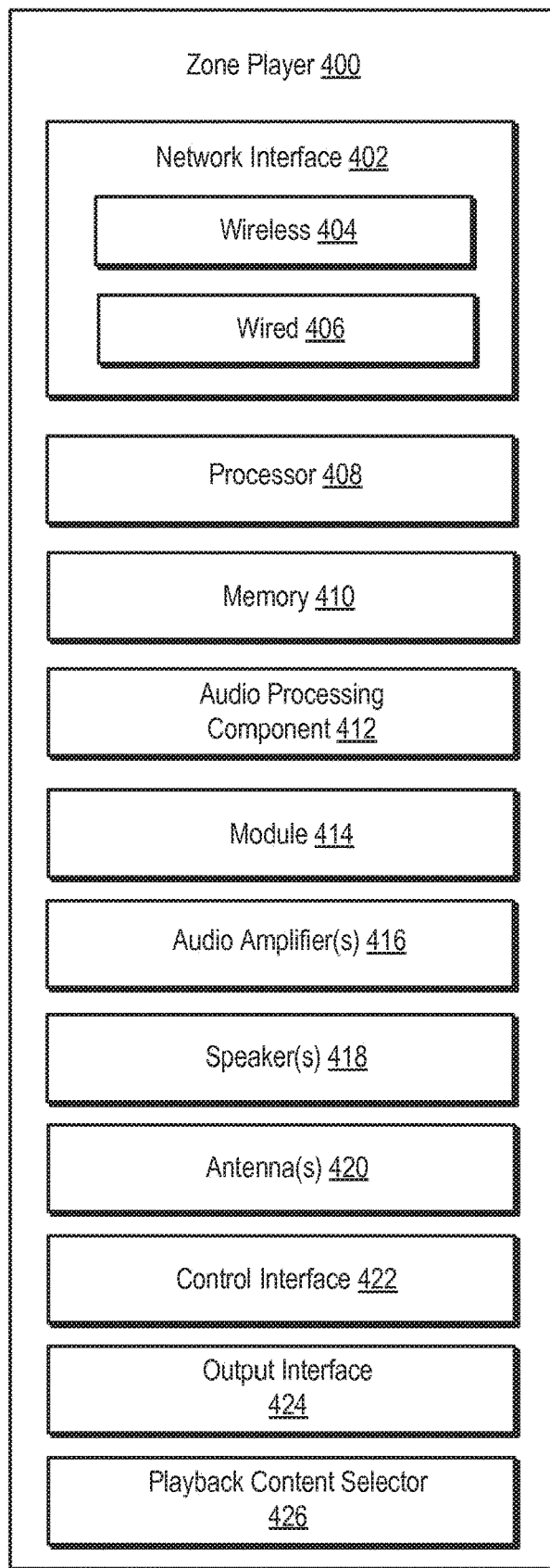
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, 802.15, 4G mobile communication standard, and so on). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes multiple wireless 404 interfaces. In some embodiments, a zone player includes multiple wired 406 interfaces. In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable storage medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for playback through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

In some embodiments, the zone player may include a control interface, such as the control interfaces 212, 216 of zone players 202 (FIG. 2B), 204 (FIG. 2C), respectfully. In the illustrated embodiment, one or more input devices are connected to a control interface 422. The control interface 422 can be implemented by, for example, an audio sensor, a microphone and/or a button.

In some embodiments, the zone player 400 includes an output interface 424 to output status information. The output interface 424 can be implemented, for example, by display devices (e.g., a light emitting diode (LED), an organic light emitting diode (OLED), a liquid crystal display (LCD) and/or a touch screen. In some embodiments, the control interface 422 and the output interface 424 may be combined into a single interface. For example, the control interface 422 may be implemented by one or more soft buttons via a touch screen interface 424.

In some embodiments, the zone player 400 includes a playback content selector 426. In some embodiments, the playback content selector 426 may be part of the processor 408 and/or a software module loaded in the memory 410. The playback content selector 426 determines what content to playback when the zone player 400 is in a playback mode. For example, a user may pause and then resume playback of the zone player 400 via the control interface 422. However, in some instances, the previously played content may not be available for playback. For example, a streaming content server may not respond or a music library may be inaccessible. Thus, in some such instances, the playback content selector 426 selects alternate content for playback without additional user input.

In some embodiments, the playback content selector 426 selects content similar to the last content played by the zone player 400. For example, the playback content selector 426 may monitor what content has played and generate a queue (e.g., a playback queue) including content with similar attributes (e.g., one or a combination of artist, genre, tempo, mood, etc.). In some embodiments, the playback content selector 426 may monitor and update a list of similar content based on content that has played over a selected period (e.g., the last hour).

In some embodiments, the playback content selector 426 may select content designated "favorites." For example, the favorites content may include a user configured playlist and/or a most-listened-to playlist or streaming content (e.g., an Internet radio station). In some examples, the favorites content may vary based on the time of day or day of the week. For example, the favorites content during the morning hours when a user is waking up may be different than the favorites content during the evening hours while the user is eating dinner.

In some embodiments, the playback content selector 426 may select content from a playback queue that was previously associated with the zone player 400 and/or a zone group. In some embodiments, the playback content selector 426 may select content from a different zone player and/or zone group in the household. For example, the playback content selector 426 of the zone player 110 may request a queue from the zone player 102. In some embodiments, the playback content selector 426 may determine alternate content is not "playable" at that moment. In some such embodiments, the playback content selector 426 indicates content is "unplayable," for example, via the output interface 424.

A commercial example, presently known as the PLAY: 5™, is a zone player with a built-in amplifier and speakers that is capable of retrieving audio directly from the source, such as on the Internet or on the local network, for example. In particular, the PLAY:5™ is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY:5™.

IV. Example Controller

Figure 5:
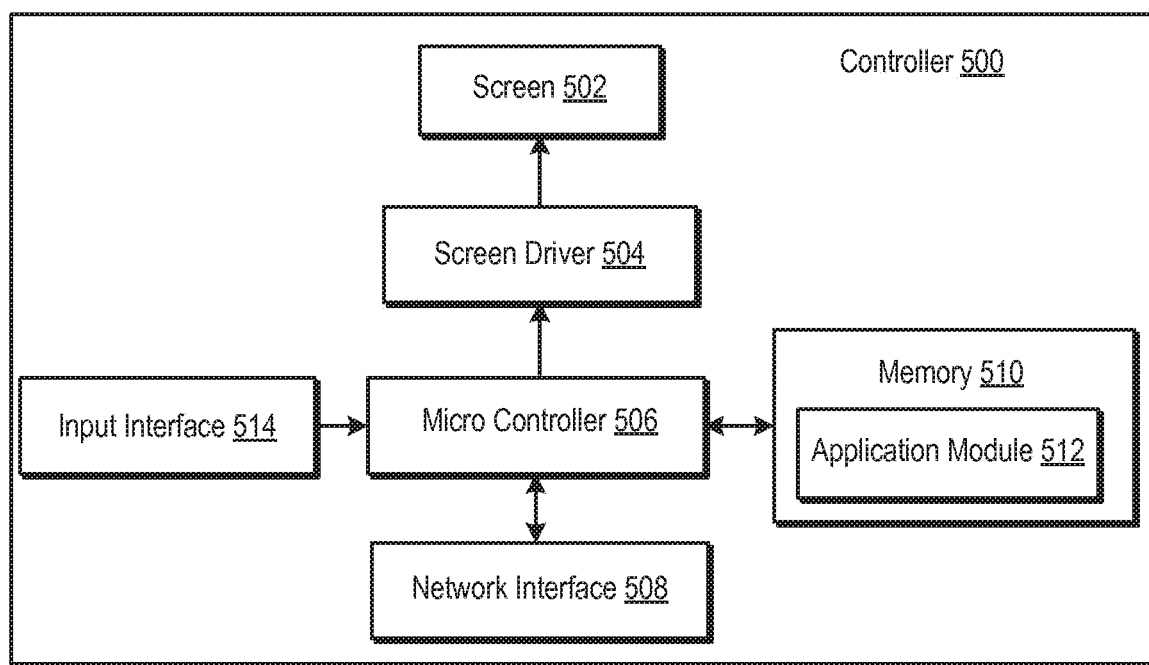
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b, 802.11g, 802.11n, 802.15, 4G mobile communication standard, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio playback. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an IPHONE™, IPAD™ or any other smart phone or network-enabled device (e.g., a networked computer such as a PC or MAC™) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group playback an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio playback is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zones, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed or learned action. Other kinds of zone scenes can be programmed or learned by the system over time.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Playback Queue

As discussed above, in some embodiments, a zone player may be assigned to or otherwise associated with a playback queue identifying zero or more media items for playback by the zone player. The media items identified in a playback queue may be represented to the user via an interface on a controller. For instance, the representation may show the user (or users if more than one controller is connected to the system) how the zone player is traversing the playback queue, such as by highlighting the "now playing" item, graying out the previously played item(s), highlighting the to-be-played item(s), and so on.

In some embodiments, a single zone player is assigned to a playback queue. For example, zone player 114 in the bathroom of FIG. 1 may be linked or assigned to a "Bathroom" playback queue. In an embodiment, the "Bathroom" playback queue might have been established by the system as a result of the user naming the zone player 114 to the bathroom. As such, contents populated and identified in the "Bathroom" playback queue can be played via the zone player 114 (the bathroom zone).

In some embodiments, a zone or zone group is assigned to a playback queue. For example, zone players 106 and 108 in the family room of FIG. 1 may be linked or assigned to a "Family room" playback queue. In another example, if family room and dining room zones were grouped, then the new group would be linked or assigned to a "family room+dining room" playback queue. In some embodiments, the "family room+dining room" playback queue would be established based upon the creation of the group. In some embodiments, upon establishment of the new group, the "family room+dining room" playback queue can automatically include the contents of one (or both) of the playback queues associated with either the family room or dining room or both. In one instance, if the user started with the family room and added the dining room, then the contents of the "family room" playback queue would become the contents of the "family room+dining room" playback queue. In another instance, if the user started with the family room and added the dining room, then the "family room" playback queue would be renamed to the "family room+dining room" playback queue. If the new group was "ungrouped," then the "family room+dining room" playback queue may be removed from the system and/or renamed to one of the zones (e.g., renamed to "family room" or "dining room"). After ungrouping, each of the family room and the dining room will be assigned to a separate playback queue. One or more of the zone players in the zone or zone group may store in memory the associated playback queue.

As such, when zones or zone groups are "grouped" or "ungrouped" dynamically by the user via a controller, the system will, in some embodiments, establish or remove/rename playback queues respectively, as each zone or zone group is to be assigned to a playback queue. In other words, the playback queue operates as a container that can be populated with media items for playback by the assigned zone. In some embodiments, the media items identified in a playback queue can be manipulated (e.g., re-arranged, added to, deleted from, and so on).

Figure 6:
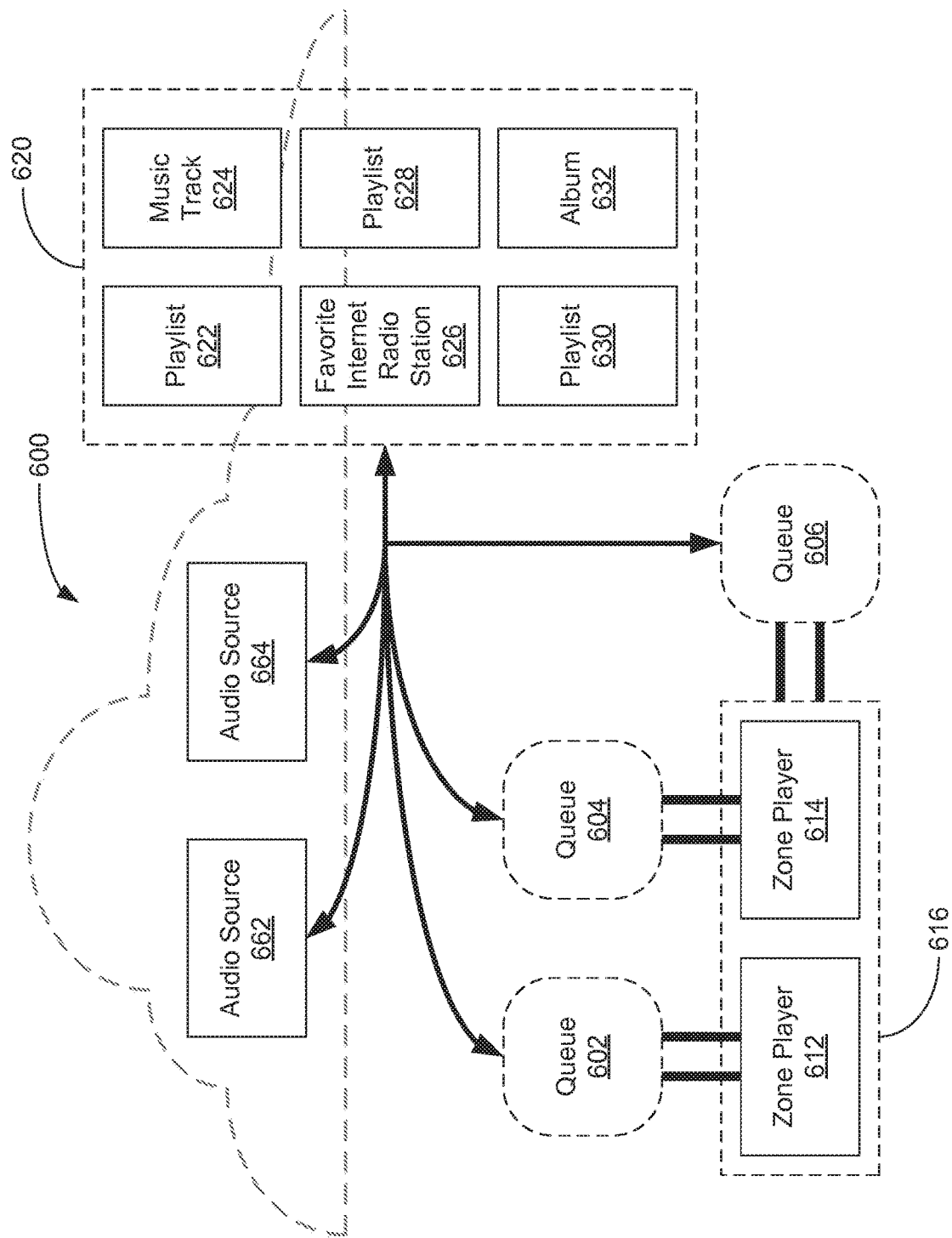
FIG. 6 shows an example network for media content playback.

By way of illustration, FIG. 6 shows an example network 600 for media content playback. As shown, the example network 600 includes example zone players 612, 614, example audio sources 662, 664, and example media items 620. The example media items 620 may include playlist 622, music track 624, favorite Internet radio station 626, playlists 628 and 630, and album 632. In one embodiment, the zone players 612, 614 may be any of the zone players shown in FIGS. 1, 2, and 4. For instance, zone players 612, 614 may be the zone players 106, 108 in the Family Room.

In one example, the example audio sources 662, 664, and example media items 620 may be partially stored on a cloud network, discussed more below in connection to FIG. 8. In some cases, the portions of the audio sources 662, 664, and example media items 620 may be stored locally on one or both of the zone players 612, 614. In one embodiment, playlist 622, favorite Internet radio station 626, and playlist 630 may be stored locally, and music track 624, playlist 628, and album 632 may be stored on the cloud network.

Each of the example media items 620 may be a list of media items playable by a zone player(s). In one embodiment, the example media items may be a collection of links or pointers (e.g., URI) to the underlying data for media items that are stored elsewhere, such as the audio sources 662, 664. In another embodiment, the media items may include pointers to media content stored on the local zone player, another zone player over a local network, or a controller device connected to the local network.

As shown, the example network 600 may also include an example queue 602 associated with the zone player 612, and an example queue 604 associated with the zone player 614. Queue 606 may be associated with a group, when in existence, comprising zone players 612, 614. Queue 606 might comprise a new queue or exist as a renamed version of queue 602 or 604. In some embodiments, in a group, the zone players 612, 614 would be assigned to queue 606 and queues 602, 604 would not be available at that time. In some embodiments, when the group is no longer in existence, queue 606 is no longer available. Each zone player and each combination of zone players in a network of zone players, such as those shown in FIG. 1 or that of example zone players 612, 614, and example combination 616, may be uniquely assigned to a corresponding playback queue.

A playback queue, such as playback queues 602, 604, 606, may include identification of media content to be played by the corresponding zone player or combination of zone players. As such, media items added to the playback queue are to be played by the corresponding zone player or combination of zone players. The zone player may be configured to play items in the queue according to a specific order (such as an order in which the items were added), in a random order, or in some other order.

The playback queue may include a combination of playlists and other media items added to the queue. In one embodiment, the items in playback queue 602 to be played by the zone player 612 may include items from the audio sources 662, 664, or any of the media items 622-632. The playback queue 602 may also include items stored locally on the zone player 612, or items accessible from the zone player 614. For instance, the playback queue 602 may include Internet radio 626 and album 632 items from audio source 662, and items stored on the zone player 612.

When a media item is added to the queue via an interface of a controller, a link to the item may be added to the queue. In a case of adding a playlist to the queue, links to the media items in the playlist may be provided to the queue. For example, the playback queue 602 may include pointers from the Internet radio 626 and album 632, pointers to items on the audio source 662, and pointers to items on the zone player 612. In another case, a link to the playlist, for example, rather than a link to the media items in the playlist may be provided to the queue, and the zone player or combination of zone players may play the media items in the playlist by accessing the media items via the playlist. For example, the album 632 may include pointers to items stored on audio source 662. Rather than adding links to the items on audio source 662, a link to the album 632 may be added to the playback queue 602, such that the zone player 612 may play the items on the audio source 662 by accessing the items via pointers in the playlist 632.

In some cases, contents as they exist at a point in time within a playback queue may be stored as a playlist, and subsequently added to the same queue later or added to another queue. For example, contents of the playback queue 602, at a particular point in time, may be saved as a playlist, stored locally on the zone player 612 and/or on the cloud network. The saved playlist may then be added to playback queue 604 to be played by zone player 614.

VI. Example Ad-Hoc Network

Figure 7:
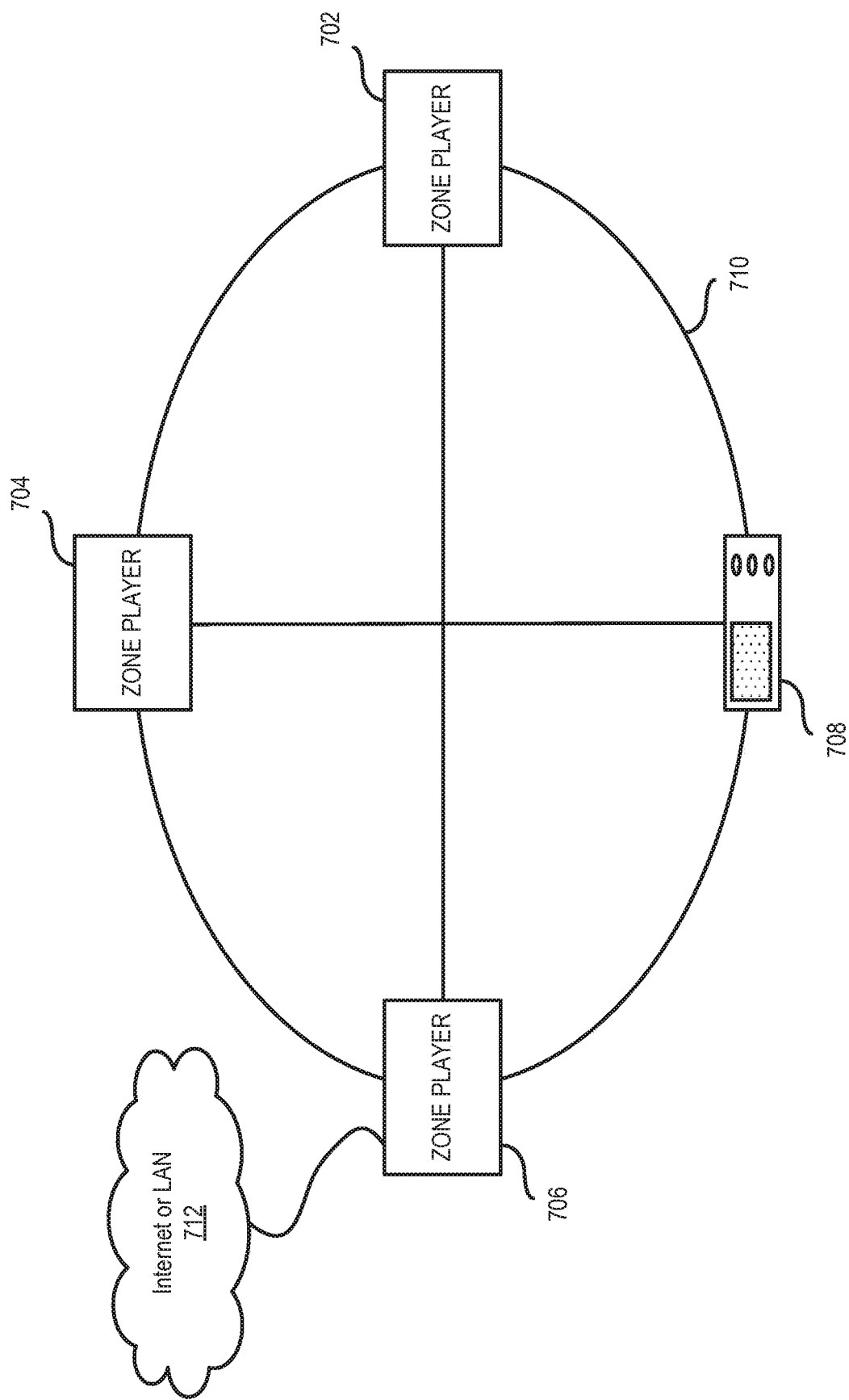
FIG. 7 shows an example ad-hoc playback network.

Particular examples are now provided in connection with FIG. 7 to describe, for purposes of illustration, certain embodiments to provide and facilitate connection to a playback network. FIG. 7 shows that there are three zone players 702, 704, 706 and a controller 708 that form a network branch that is also referred to as an Ad-Hoc network 710. The network 710 may be wireless, wired, or a combination of wired and wireless technologies. In general, an Ad-Hoc (or "spontaneous") network is a local area network or other small network in which there is generally no one access point for all traffic. With an established Ad-Hoc network 710, the devices 702, 704, 706, 708 can all communicate with each other in a "peer-to-peer" style of communication, for example. Furthermore, devices may join and/or leave from the network 710, and the network 710 will automatically reconfigure itself without needing the user to reconfigure the network 710. While an Ad-Hoc network is referenced in FIG. 7, it is understood that a playback network may be based on a type of network that is completely or partially different from an Ad-Hoc network.

Using the Ad-Hoc network 710, the devices 702, 704, 706, 708 can share or exchange one or more audio sources and be dynamically grouped (or ungrouped) to play the same or different audio sources. For example, the devices 702, 704 are grouped to playback one piece of music, and at the same time, the device 706 plays back another piece of music. In other words, the devices 702, 704, 706, 708, as shown in FIG. 7, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 710 (or household identifier), though a HOUSEHOLD may be identified with a different area or place.

In certain embodiments, a household identifier (HHID) is a short string or an identifier that is computer-generated to help ensure that it is unique. Accordingly, the network 710 can be characterized by a unique HHID and a unique set of configuration variables or parameters, such as channels (e.g., respective frequency bands), service set identifier (SSID) (a sequence of alphanumeric characters as a name of a wireless network), and WEP keys (wired equivalent privacy) or other security keys. In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., security keys). In an embodiment, the CP also provides the user with a HOUSEHOLD configuration user interface. The CP function can be provided by a computer running a CP application module, or by a handheld controller (e.g., the controller 708) also running a CP application module, for example. The zone player is any other device on the network that is placed to participate in the automatic configuration process. The ZP, as a notation used herein, includes the controller 708 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 706 in FIG. 7 is shown to be connected to both networks, for example. The connectivity to the network 712 is based on Ethernet and/or Wireless, while the connectivity to other devices 702, 704, 708 is based on Wireless and Ethernet if so desired.

It is understood, however, that in some embodiments each zone player 706, 704, 702 may access the Internet when retrieving media from the cloud (e.g., the Internet) via the bridging device. For example, zone player 702 may contain a uniform resource locator (URL) that specifies an address to a particular audio track in the cloud. Using the URL, the zone player 702 may retrieve the audio track from the cloud, and ultimately play the audio out of one or more zone players.

VII. Another Example System Configuration

Figure 8:
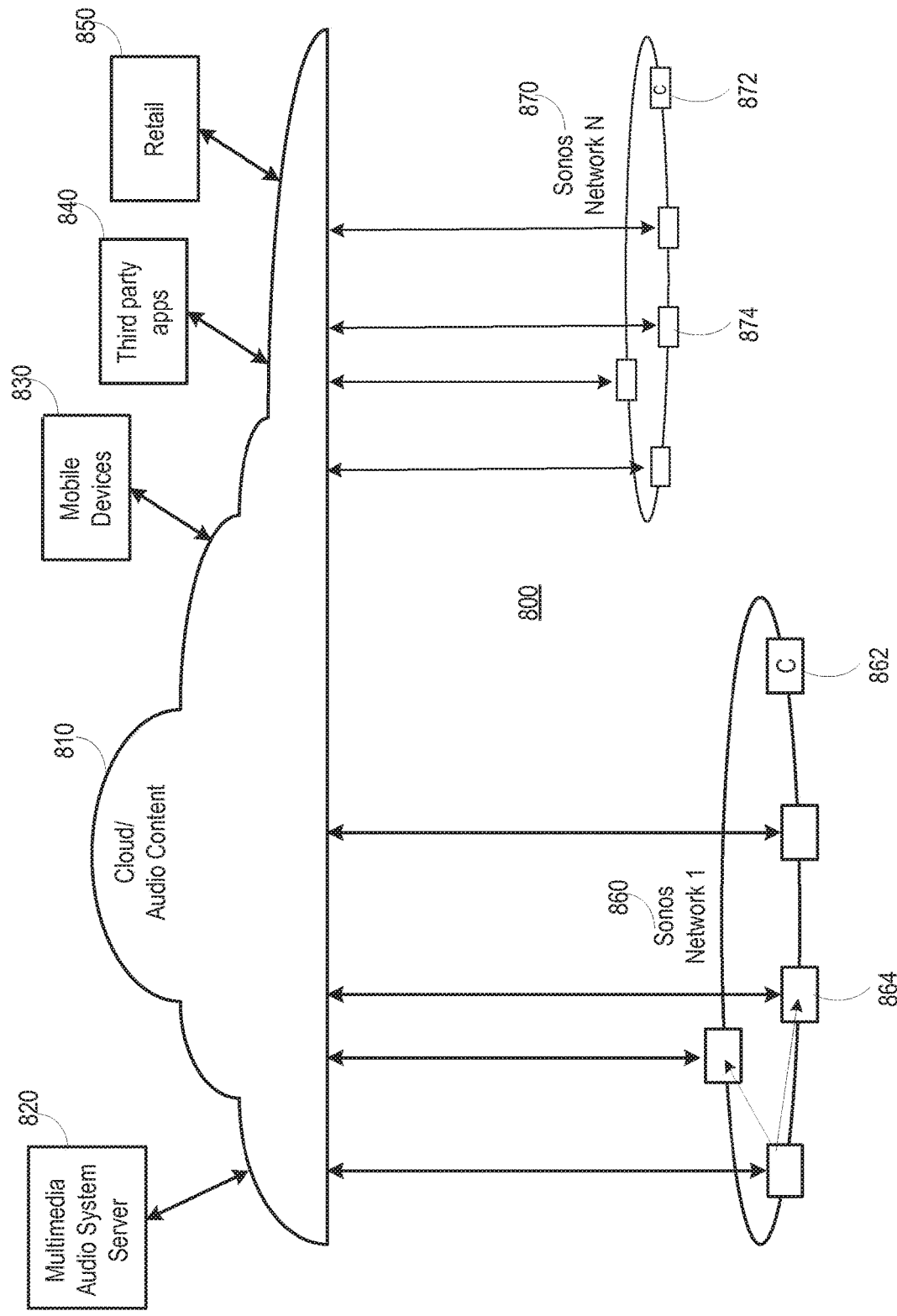
FIG. 8 shows a system including a plurality of networks including a cloud-based network and at least one local playback network.

FIG. 8 shows a system 800 including a plurality of interconnected networks including a cloud-based network and at least one local playback network. A local playback network includes a plurality of playback devices or players, though it is understood that the playback network may contain only one playback device. In certain embodiments, each player has an ability to retrieve its content for playback. Control and content retrieval can be distributed or centralized, for example. Input can include streaming content provider input, third party application input, mobile device input, user input, and/or other playback network input into the cloud for local distribution and playback.

As illustrated by the example system 800 of FIG. 8, a plurality of content providers 820-850 can be connected to one or more local playback networks 860-870 via a cloud and/or other network 810. Using the cloud 810, a multimedia audio system server 820 (e.g., Sonos™), a mobile device 830, a third party application 840, a content provider 850 and so on can provide multimedia content (requested or otherwise) to local playback networks 860, 870. Within each local playback network 860, 870, a controller 862, 872 and a playback device 864, 874 can be used to playback audio content.

VIII. Example User Interface

Figure 9:
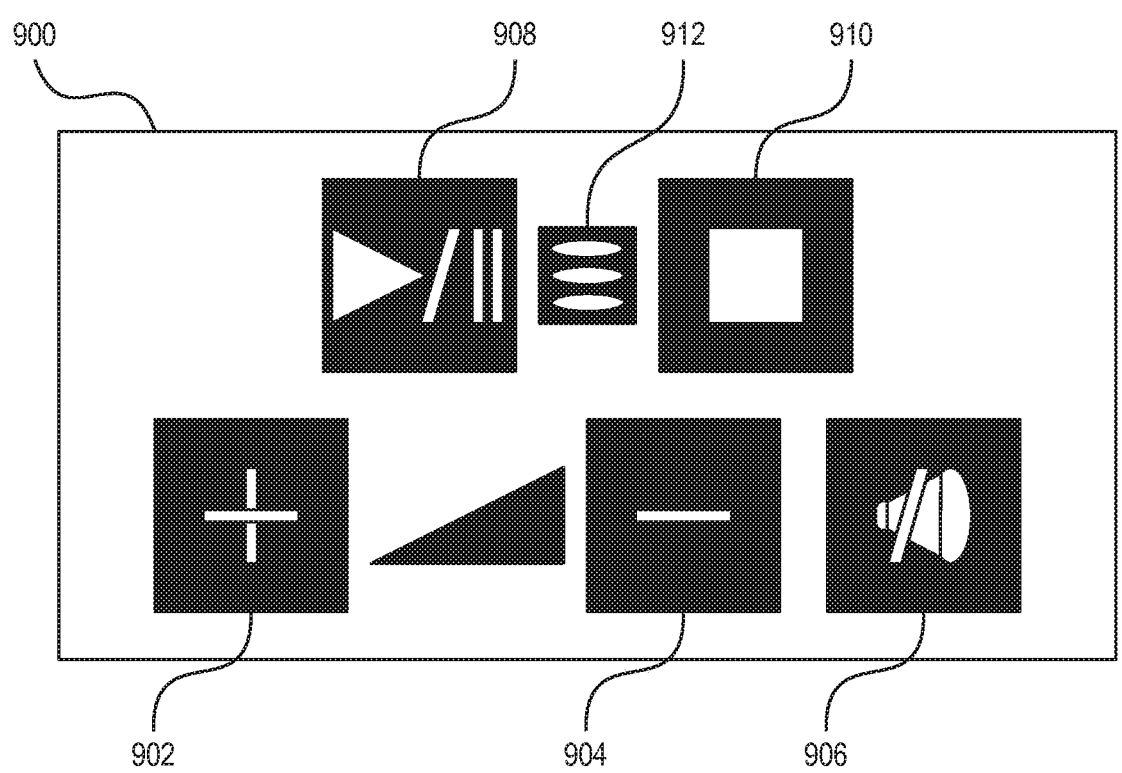
FIG. 9 shows an example user interface according to an embodiment.

FIG. 9 shows an example user interface 900 according to an embodiment. The user interface 900 includes a control interface (e.g., the control interface 422 of FIG. 4) including input controls 902, 904, 906, 908, 910 and an output interface (e.g., the output interface 424 of FIG. 4) including one or more light emitting diode(s) 912. In the illustrated example, input controls 902, 904, 906, 908, 910 are buttons (e.g., hard buttons) included with the zone player. In some examples, the user interface 900 may be implemented via a touch screen interface (e.g., an LCD interface of a zone player and/or a controller). For example, the input controls 902, 904, 906, 908, 910 may be implemented as "soft" buttons that are displayed via the touch screen interface. Although the illustrated example includes button input controls, other types of control interface controls may additionally (or alternatively) be included. For example, the user interface 900 may include a microphone to receive audio commands (e.g., "play," "pause," "stop," "volume up," "volume down," "mute," etc.) from a user. In some examples, the user interface 900 may include fewer or other control interface controls.

The input control 902 increases the volume of the zone player during content playback. In some examples, the input control 902 may be used to increase the volume of a zone group during content playback. The input control 904 decreases the volume of the zone player during content playback. In some examples, the input control 904 may be used to decrease the volume of a zone group during content playback. The input control 906 may be used to mute or unmute the zone player or zone group during content playback.

In some examples, an input control may perform multiple functions. For example, a user may hold the input control 904 to mute content playback. In some other examples, a user may use the input control 902 to unmute content playback. In some other examples, selecting the user input 902 while the volume level is set to zero may cause the volume level to an audible level rather than incrementally. For example, selecting the user input 902 three times while the volume level is set to zero may cause the volume level to jump to a volume level of ten. In contrast, selecting the user input 902 three times while the volume level is set to four may cause the volume to increment to a volume level of seven.

The input control 908 (e.g., a play/pause control) enables content playback when the zone player or zone group is not playing content. In addition, the play/pause control 908 enables pausing content playback when the zone player is playing content (e.g., in a content playback mode). When the play/pause control 908 is selected while content playback is paused, content playback resumes playback of the last played content. For example, selecting the play/pause control 908 may resume content playback in the middle of a song. In some examples, the playback task and the pause task are implemented via two different input controls.

The input control 910 enables stopping of content playback. In some examples, when the play/pause control 908 is selected while content playback is stopped, content playback resumes playback at the beginning of the last played content. That is, selecting play/pause control 908 after selecting input control 910 restarts a song rather than resuming playback in the middle of the song. In some examples, the stop task of the input control 910 may be included (or combined) with the play/pause control 908. For example, a user may pause content playback by selecting the play/pause control 908 or stop content playback via a hold of the play/pause control 908.

The user interface 900 outputs information via the output interface 912. In the illustrated example, the output interface 912 includes three LEDs that may indicate the state of the zone player (e.g., ON or OFF), a playback mode (e.g., content playback, content playback paused or content playback stopped), network connection states (e.g., accessing Internet content), etc. In the illustrated example of FIG. 9, the LEDs 912 flash to indicate playback content is "unplayable." In some examples, the user interface 900 may include one or more other output interfaces such as a touch screen interface or an LCD interface to display additional information (e.g., artist name, current playback content title, etc.).

IX. Example Methods to Provide Play/Pause Content

Figure 10:
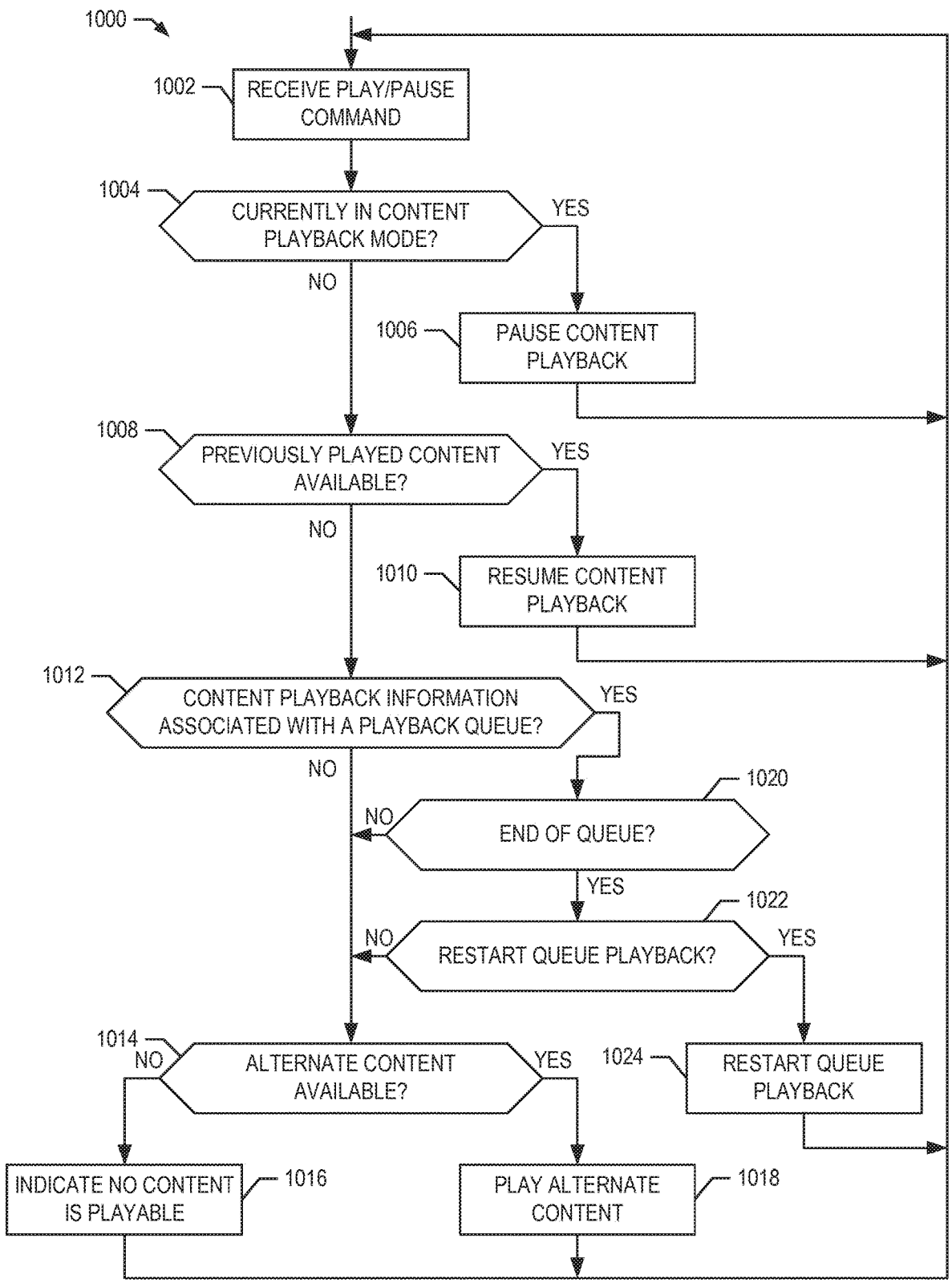
FIG. 10 shows an illustrative flowchart for an example method for determining playback content.

FIG. 10 shows an illustrative flowchart of an example method 1000 to determine playback content when a user selects play/pause using a control interface (e.g., the example input controls 908, 910 of FIG. 9). The example method 1000 of FIG. 10 begins at block 1002 when a play/pause command is received at a zone player. For example, the user may select the play/pause command 908 of the user interface 900 of FIG. 9 (e.g., a user interface of a zone player, a controller, etc.). At block 1004, a determination is made regarding whether the zone player is in content playback mode. For example, the playback content selector 426 of FIG. 4 may obtain a state variable indicating the playback mode of one or more zone players. If, at block 1004, the zone player is currently operating in the content playback mode, then, at block 1006, the playback content selector 426 pauses content playback. Control then returns to block 1002 to wait for another play/pause command.

Otherwise, if, at block 1004, the zone player is not operating in the content playback mode, then, at block 1008, a determination is made as to whether content is available for playback. The content may be from a playback queue, as described above. In some examples, when content playback is stopped or paused, the zone player stores playback state information (e.g., what content is to be played when the zone player resumes operating in the content playback mode, content playback information, etc.), for example, in a state variable. Thus, the playback content selector 426 may obtain the content playback information from the state variable and determine whether the position in the playback queue is available for playback. If, at block 1008, the content is available for playback, then, at block 1010, the zone player resumes operating in the content playback mode by playing the content. If the content was previously playing before the content playback mode was stopped or paused, the content playback resumes at the previously played position. Control then returns to block 1002 to wait for another play/pause command.

However, in some examples, the content playback information may correspond to content unavailable for playback (e.g., "unplayable"). For example, the playback queue may include content that is no longer accessible. For example, a content server may not respond to requests for streaming content, audio data corresponding to the content for playback is not retrievable (e.g., the content is no longer available for streaming (e.g., digital streaming rights for content may change), the format of the content may not be playable by the zone player, etc.), or a line-in content source may not be connected to the zone player. In some other examples, the playback content in a playback queue may no longer be available for playback (e.g., a music library is inaccessible) or the playback queue may be empty. For example, the playback queue may be cleared (or emptied). If, at block 1008, the content playback information corresponds to content that is unplayable and/or unavailable, then, at block 1012, the playback content selector 426 determines whether the content playback information is associated with a playback queue.

If, at block 1012, the content playback information is not associated with a playback queue, then, at block 1014, the playback content selector 426 determines whether alternate playback content is available for playback by the zone player. For example, the playback content selector 426 may determine whether alternate playback content corresponding to the content playback information is available for playback as described below in connection with FIG. 11. If, at block 1014, alternate content is not available for playback, then, at block 1016, an indication that no playback content is available for playback is provided. For example, the LED interface 912 of the user interface 900 (FIG. 9) may flash to indicate no playback content is available for playback. In some examples, the zone player may output an auditory indication that playable content is unavailable. For example, the zone player may output a tone, a sound, a chime, etc. Additional methods of indicating playback content is unavailable and/or unplayable may also be used. Control then returns to block 1002 to wait for another play/pause command. In contrast, if, at block 1014, alternate content is available for playback, then, at block 1018, the zone player plays the alternate playback content. That is, the playback content selector 426 automatically places information identifying alternate content in a playback queue, which enables playback of the alternate content. Control then returns to block 1002 to wait for another play/pause command.

Returning to block 1012, if the content playback information is associated with a playback queue, then, at block 1020, a determination is made whether the content playback information corresponds to the end of the playback queue. For example, the content playback information may correspond to the last item in the playback queue, the playback queue may be empty, etc. If the playback queue is not at the end (e.g., the last item in the queue is being or has been played), then control proceeds to block 1014 to determine alternate playback content for playback.

Otherwise, if, at block 1020, the zone player has reached the end of the playback queue, then, at block 1022, a determination is made as to whether a repeat function has been selected. For example, a user may set the playback queue to repeat when the end of the playback queue is reached. If the repeat function is not selected or the playback queue is empty, then control proceeds to block 1014 to determine alternate content for playback. However, if, at block 1022, the repeat function is selected and the playback queue includes at least one playable item, then, at block 1024, playback of the playback queue repeats. Control then returns to block 1002 to wait for another play/pause command.

Figure 11:
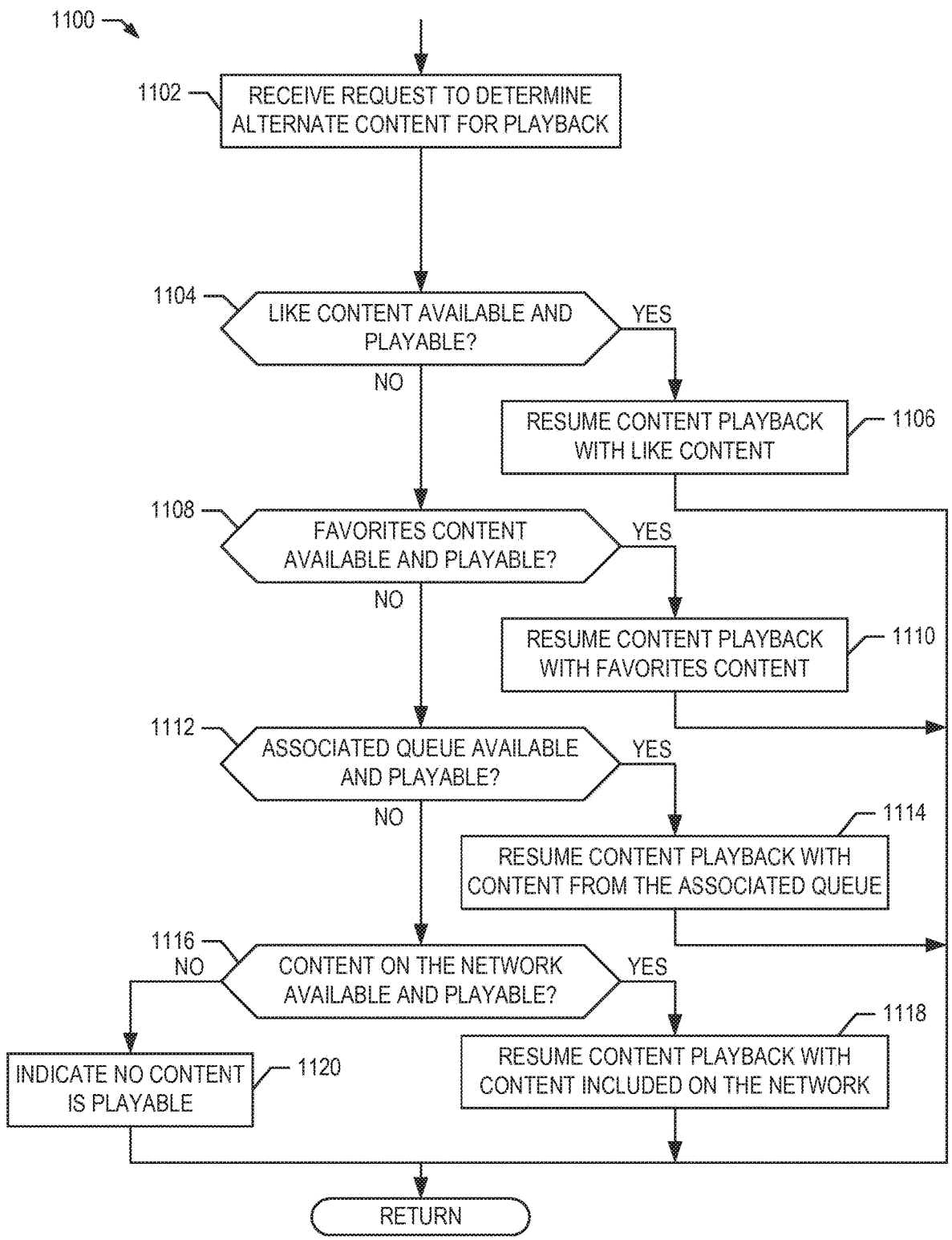
FIG. 11 shows an illustrative flowchart for an example method for selecting alternate content for playback.

FIG. 11 shows an illustrative flowchart of an example method 1100 for selecting alternate playback content for playback (e.g., identifying and placing information identifying alternate playback content for playback in a playback queue). The example method 1100 may be used to implement block 1014 of FIG. 10. The example method 1100 begins at block 1102 when a request to determine alternate playback content for playback is received. At block 1104, a determination is made whether similar or "like" content is available for playback and playable. Like content may be similar to the last content played by the zone player prior to the content becoming unavailable for playback. Methods, apparatus and systems for determining and refining like content are described in, for example, U.S. patent application Ser. No. 13/536,154, by Riemann, entitled "Shift to Corresponding Media in a Playback Queue," which is incorporated by reference herein in its entirety.

In some examples, the playback content selector 426 (FIG. 4) may provide information identifying the like content to a third party source (e.g., a media server) to facilitate playback of alternate playback content. For example, the playback content selector 426 may determine that the like content includes a particular music genre (e.g., reggae music). As a result, the playback content selector 426 may provide (e.g., automatically provide) reggae music identifying information to a streaming service, such as PANDORA®, which is operated by Pandora Music, Inc., to "seed" an Internet radio station. However, the playback content selector 426 may utilize other content recommendation services as well. In some examples, the content recommendation service may return a message indicating similar or like playback content is unavailable for playback and/or unplayable (e.g., available but in a wrong format, etc.).

If, at block 1104, the playback content selector 426 determines similar or like content is available for playback and playable, then, at block 1106, the zone player resumes content playback with the similar playback content. Control then returns to a calling function or process such as the example program 1000 of FIG. 10, and the example process of FIG. 11 ends.

Otherwise, if, at block 1104, the playback content selector 426 determines similar or like playback content is unavailable for playback and/or unplayable, then, at block 1108, the playback content selector 426 determines whether "favorites" content is available for playback and playable. Favorites may include a playlist or streaming content that is either configured by the user or determined based on other playback content selected by, for example, the user. In some examples, a default playlist of favorites content may be available for the playback content selector 426 to select. In some examples, the playback content selector 426 may determine favorites content based on the time of day (e.g., morning, afternoon, evening), day of week (e.g., weekend or weekday), zone of playback (e.g., bedroom, kitchen, patio, etc.), etc. In some examples, the playback content selector 426 may determine favorites content based on the frequency a playlist of streaming content (e.g., a radio station) is accessed or selected for playback by the user.

If, at block 1108, the playback content selector 426 determines favorites content is available for playback and playable, then, at block 1110, the zone player resumes content playback with the favorites content. Control then returns to a calling function or process such as the example program 1000 of FIG. 10 and the example process of FIG. 11 ends.

Otherwise, if, at block 1108, the playback content selector 426 determines favorites content is unavailable for playback and/or unplayable, then, at block 1112, the playback content selector 426 determines whether content from a playback queue associated with the zone player (or zone group) is available for playback and playable. For example, the playback content selector 426 may identify a previously played playback queue or a next-to-be played playback queue that includes playback content available for playback. If, at block 1112, the playback content selector 426 determines content from at least one previously associated playback queue is available for playback and playable, then, at block 1114, the zone player resumes content playback with content from the playback queue associated with the zone player (or zone group). Control then returns to a calling function or process such as the example program 1000 of FIG. 10 and the example process of FIG. 11 ends.

Otherwise, if, at block 1112, the playback content selector 426 determines content from a playback queue associated with the zone player (or zone group) is unavailable for playback and/or unplayable by the zone player, then, at block 1116, the playback content selector 426 determines whether content (e.g., a playback queue) from another zone player (or zone group) included on the network is available for playback. For example, the zone player 110 playback content selector 426 may request content for playback from a zone player (or zone group) included on the network (e.g., the zone player 112). If, at block 1116, the playback content selector 426 determines content from another zone player (or zone group) is available for playback and playable, then, at block 1118, the zone player resumes content playback with the content from another zone player (or zone group) included on the network. Control then returns to a calling function or process such as the example program 1000 of FIG. 10 and the example process of FIG. 11 ends.

In contrast, if, at block 1116, the playback content selector 426 determines content from another zone player (or zone group) is unavailable for playback and/or unplayable, then, at block 1120, the playback content selector 426 indicates content is unplayable (e.g., unavailable for playback by the zone player, available but in a wrong format, etc.). For example, the playback content selector 426 may cause LEDs (e.g., the output interface 912 of the user interface 900 of FIG. 9) to flash. Control then returns to a calling function or process such as the example program 1000 of FIG. 10 and the example process of FIG. 11 ends.

In operation, for example, a user, while getting ready in the morning, may listen to a streaming Internet radio station recommended by a friend. The user, enjoying listening to country music for the first time, then pauses (e.g., via the play/pause control 908 of the user interface 900 of the zone player) playback of the radio station while leaving the house to go to work. Upon returning from work, and while changing into workout clothes, the user may select the play/pause control 908 of the zone player to resume playback of the streaming Internet radio station. As a result, the content playback selector of the zone player may obtain content playback information to resume playback of the Internet radio station. The playback content selector may send a request message to the Internet radio station requesting playback content to playback based on the content playback information. In response to a message requesting playback content from the Internet radio station, the playback content selector receives a content "unplayable" message from the Internet radio station. Thus, the playback content selector attempts to identify alternate content to provide to the user in response to the play/pause command and the content "unplayable" message.

As this is the first time the user is listening to country music, the playback content selector of the zone player is unable to identify similar or "like" music to playback. The playback content selector then attempts to identify favorites content or an associated queue, either from the zone player, another zone player on the network, or a zone group, to playback. In the illustrated example, the playback content selector 426 of FIG. 4 obtains a playback queue from another zone player, and resumes content playback with content from the associated queue. However, if the playback content selector is unable to identify alternate content, the playback content selector may cause the zone player to indicate playback content is unavailable for playback at the moment. For example, a series of LEDs included with the zone player may flash for a period (e.g., two seconds).

IX. Conclusion

The descriptions above disclose various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

As suggested above, the present application involves enabling content playback control via a user interface included with a zone player. In one aspect, a method is provided. The method includes receiving a command to play audio from a zone, the zone including one or more playback devices, wherein the zone is configured to play items from a playback queue responsive to the command to play audio. The example method also includes determining that the playback queue includes no playable items. The example method also includes automatically placing information identifying at least one playable item in the playback queue. The example method also includes, responsive to the command to play audio, causing to play the at least one playable item by the zone.

In another aspect, a system is provided. The system includes a zone including one or more playback devices, and a processor configured to execute instructions. The instructions are executable to cause the processor to receive a command to play audio from the zone, wherein the zone is configured to play items from a playback queue in response to the command to play audio. The instructions to also cause the processor to determine that the playback queue includes no playable items. The instructions to also cause the processor to automatically place information identifying at least one playable item in the playback queue. The instructions to also cause the processor to, in response to the command to play audio, cause to play the at least one playable item by the zone.

In a further aspect, a tangible computer-readable storage medium having instructions stored thereon is provided. The instructions are executable by a computing device to cause the computing device to perform functions including receiving a command to play audio from a zone, the zone including one or more playback devices, wherein the zone is configured to play items from a playback queue in response to the command to play audio. The instructions are to also cause the computing device to perform functions including determining that the playback queue includes no playable items. The instructions are to also cause the computing device to perform functions including automatically placing information identifying at least one playable item in the playback queue. The instructions are to also cause the computing device to perform functions including, in response to the command to play audio, causing to play the at least one playable item by the zone.

Additionally, references herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

The example processes of FIGS. 10 and/or 11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 10 and/or 11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disc and to exclude propagating signals. As used herein, when the phrase "at least" is used as the transition term in a preamble of a claim, it is open-ended in the same manner as the term "comprising" is open ended.

When any of the appended claims are read to cover a purely software and/or firmware implementation, at least one of the elements in at least one example is hereby expressly defined to include a tangible storage medium such as a memory, DVD, CD, Blu-ray, and so on, storing the software and/or firmware.

We claim:

1. A system comprising:
    a playback device configured to play items from a playback queue associated with the playback device;
    one or more processors;
    a non-transitory computer-readable medium having stored thereon instructions executable by the one or more processors to perform functions comprising:
        receiving, via the playback device, a command to resume playback of previously paused audio;
        determining that the playback queue includes no playable items;
        in response to determining that the playback queue includes no playable items, placing, without user input, at least one playable item in the playback queue, wherein the at least one playable item is based on content information corresponding to the previously paused audio; and
        in response to the command to resume playback of previously paused audio, causing the at least one playable item to be played via the playback device.

2. The system of claim 1, wherein the playback device comprises a control interface, and wherein receiving the command comprises receiving the command via the control interface of the playback device.

3. The system of claim 2, wherein the control interface comprises at least one of a touch sensor, a button, and a microphone.

4. The system of claim 1, wherein the determining that the playback queue includes no playable items further comprises determining there are no items in the playback queue.

5. The system of claim 1, wherein determining that the playback queue includes no playable items further comprises:
    determining that an item is in the playback queue; and
    determining that the item is unplayable because audio data corresponding to the item is not retrievable for playback by the playback device.

6. The system of claim 1, wherein the at least one playable item comprises a playable item previously included in the playback queue associated with the playback device.

7. The system of claim 1, wherein the at least one playable item comprises a playable item provided by a third party media service that identifies the playable item based on an input from the playback device.

8. The system of claim 1, wherein receiving the command comprises receiving the command via a control device that is associated with the playback device, the functions further comprising:
    in response to determining that the playback queue includes no playable items, causing an indication that the playback queue includes no playable items to be displayed on a graphical display of the control device.

9. A non-transitory computer-readable medium having stored thereon instructions executable by one or more processors to perform functions comprising:
    receiving, via a playback device, a command to resume playback of previously paused audio, wherein the playback device is configured to play items from a playback queue associated with the playback device;
    determining that the playback queue includes no playable items;
    in response to determining that the playback queue includes no playable items, placing, without user input, at least one playable item in the playback queue, wherein the at least one playable item is based on content information corresponding to the previously paused audio; and
    in response to the command to resume playback of previously paused audio, causing the at least one playable item to be played via the playback device.

10. The non-transitory computer-readable medium of claim 9, wherein the playback device comprises a control interface, and wherein receiving the command comprises receiving the command via the control interface of the playback device.

11. The non-transitory computer-readable medium of claim 10, wherein the control interface comprises at least one of a touch sensor, a button, and a microphone.

12. The non-transitory computer-readable medium of claim 9, wherein the determining that the playback queue includes no playable items further comprises determining there are no items in the playback queue.

13. The non-transitory computer-readable medium of claim 9, wherein determining that the playback queue includes no playable items further comprises:
    determining that an item is in the playback queue; and
    determining that the item is unplayable because audio data corresponding to the item is not retrievable for playback by the playback device.

14. The non-transitory computer-readable medium of claim 9, wherein the at least one playable item comprises a playable item previously included in the playback queue associated with the playback device.

15. The non-transitory computer-readable medium of claim 9, wherein the at least one playable item comprises a playable item provided by a third party media service that identifies the playable item based on an input from the playback device.

16. The non-transitory computer-readable medium of claim 9, wherein receiving the command comprises receiving the command via a control device that is associated with the playback device, the functions further comprising:

in response to determining that the playback queue includes no playable items, causing an indication that the playback queue includes no playable items to be displayed on a graphical display of the control device.

17. A method comprising:

receiving, via a playback device, a command to resume playback of previously paused audio, wherein the playback device is configured to play items from a playback queue associated with the playback device;

determining that the playback queue includes no playable items;

in response to determining that the playback queue includes no playable items, placing, without user input, at least one playable item in the playback queue, wherein the at least one playable item is based on content information corresponding to the previously paused audio; and in response to the command to resume playback of previously paused audio, causing the at least one playable item to be played via the playback device.

18. The method of claim 17, wherein determining that the playback queue includes no playable items further comprises determining there are no items in the playback queue.

19. The method of claim 17, wherein determining that the playback queue includes no playable items further comprises:

determining that an item is in the playback queue; and determining that the item is unplayable because audio data corresponding to the item is not retrievable for playback by the playback device.

20. The method of claim 17, wherein the at least one playable item comprises a playable item previously included in the playback queue associated with the playback device.

* * * * *